INVENTOR.
CHARLES A. O'CONNOR
BY Albert F. Kronman
ATTORNEY

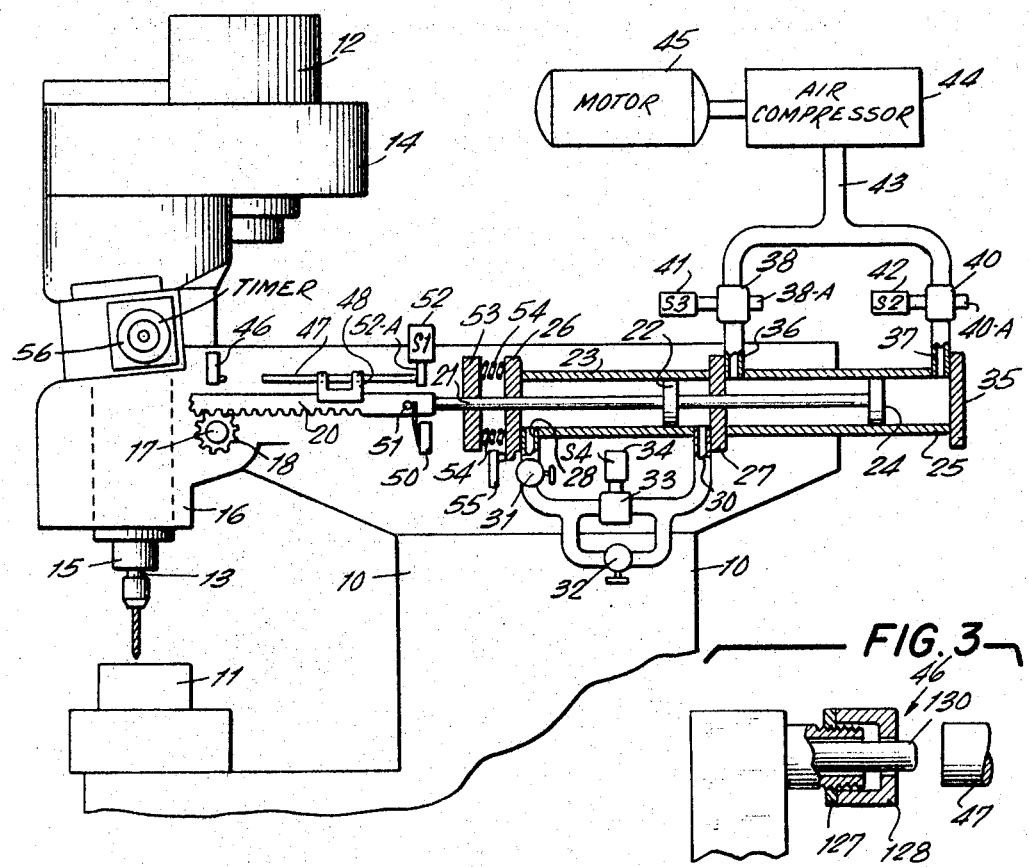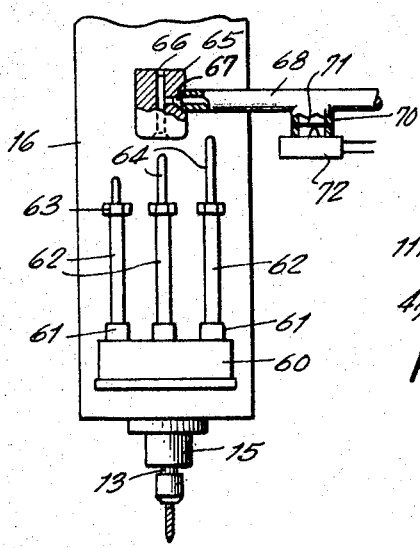

United States Patent Office 3,463,036
Patented Aug. 26, 1969

3,463,036
AUTOMATIC DRILLING DEVICE
Charles A. O'Connor, Wantagh, N.Y., assignor, by mesne assignments of one-half to Charles A. O'Connor, Wantagh, N.Y., and one-half to Richard A. Maehr, Huntington, N.Y.
Filed July 20, 1967, Ser. No. 654,834
Int. Cl. B23b 39/10, 47/18
U.S. Cl. 77—32.3   13 Claims

ABSTRACT OF THE DISCLOSURE

A control means is added to a motor drill for producing several kinds of operating cycles. A rack and pinion are coupled to the drill quill so that a movement of the rack moves the quill and drill bit in a vertical direction. The rack is connected to a first piston operating in a chamber full of oil for regulating the speed of the drill bit. A second piston is secured to the first and operates within a second cylinder subjected to gas under pressure. The piston in the air-operated cylinder furnishes the power to raise and lower the drill bit. A plurality of micro-switches are arranged for sensing the positions of the rack and quill and these switches operate in conjunction with three solenoid valves to operate the mechanism.

BACKGROUND OF THE INVENTION

The invention relates to a control for a drilling machine and has particular reference to a pecking operation which includes successive lowering and raising of the drill bit during a drilling operation to clean the drilled hole of loose chips. Normal drilling and milling operations can also be controlled by proper arrangement of circuits.

Most machine tools, such as lathes, grinders, and milling machines are easily controlled to operate for considerable time intervals without the necessity of workman supervision. The drilling machine, on the other hand, generally requires hand operation for drilling, tapping, and milling. This is especially true when deep holes are to be drilled in metal. The drill is generally advanced by hand operation to a position where the chips start to clog the drill flutes. Then the operator withdraws the drill bit to clear the chips, the bit is again lowered at a fast rate to the previous drilling position, and then advanced at a slower speed for cutting an additional amount of metal. This operation requires an experienced operator and adds to the cost of the manufactured article.

The present invention does this work automatically using the correct speeds to lower and raise the drill bit when not cutting, and then advancing the bit at a much slower speed when the bit is cutting metal. While the invention is primarily designed for this type of operation it can also be used in other ways as will be disclosed hereinafter.

BRIEF DESCRIPTION OF THE FIGURES

FIGURE 1 is a side view of a drill press which includes the control components shown partly in section.

FIGURE 2 is a front view of the machine showing three control rods secured to the housing and a sensing block secured to the quill for adjusting the quill speed.

FIGURE 3 is a side view, partly in section, showing a a limit means attached to one of the microswitches.

FIGURE 4 is a cross sectional view of one of the compressed air valves.

DESCRIPTION OF THE PREFERRED EMBODIMENT

Figures 5, 6:
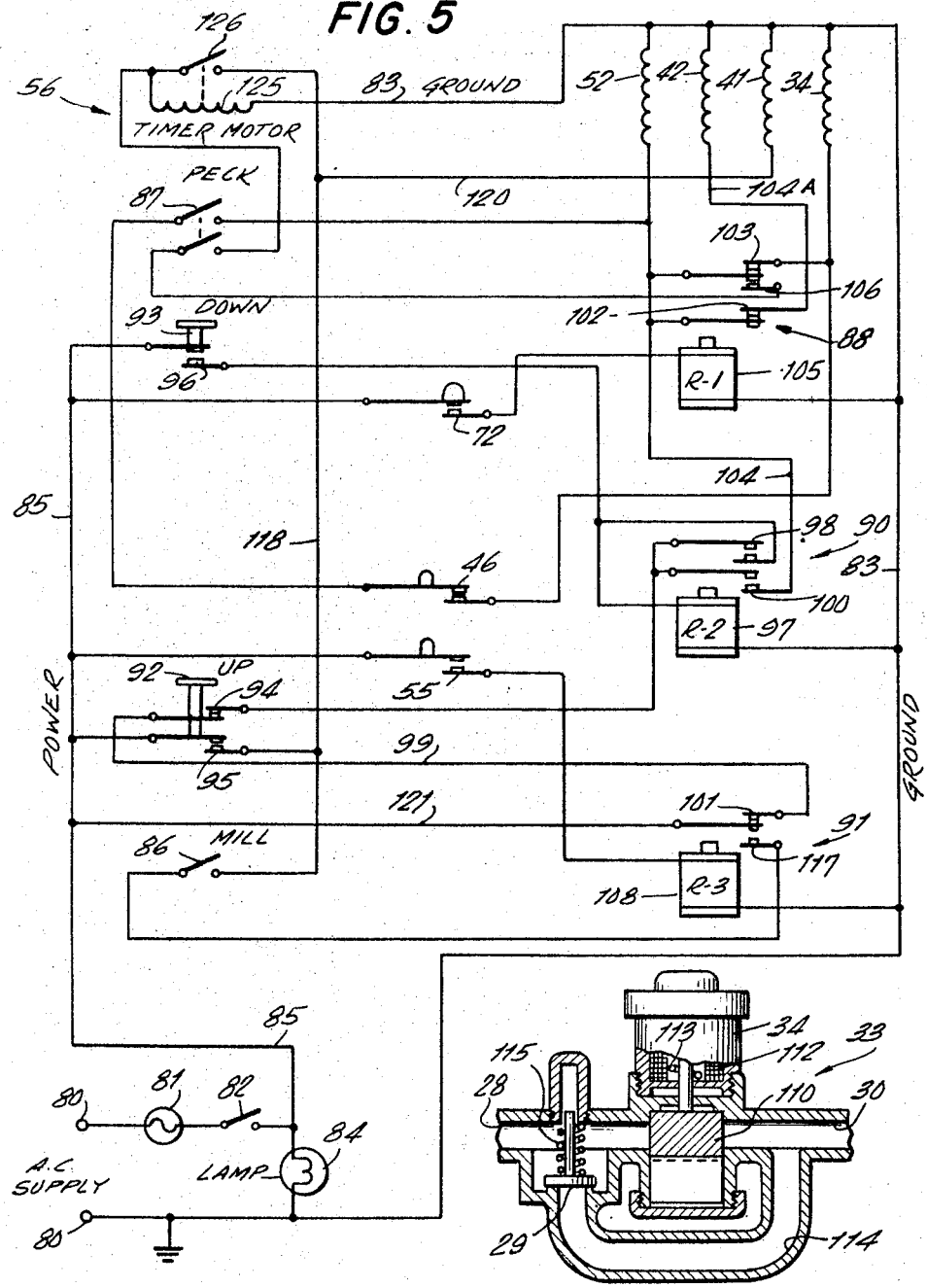
FIGURE 5 is a schematic diagram of connections showing the control circuit which can be adjusted to control the machine to perform many types of metal cutting operations.
FIGURE 6 is a cross sectional view of the valve connected between the two ends of the cylinder containing oil.

Referring now to FIGURE 1, the drill press includes a base 10 on which the quill and the other control components are mounted. One portion of the base supports the work 11 which is to be cut by a drill, tap, or milling cutter. The motor 12 which turns the drill shaft 13 is mounted above the quill and may be connected to the shaft 13 by an array of pulleys and a belt covered by a metal housing 14. The quill 15 is moved up and down within a housing 16, this motion being controlled by a shaft 17 which is coupled to a rack and pinion (not shown) inside the housing. Shaft 17 is secured to a pinion 18 outside the housing which meshes with a rack 20 for operating the pinion 18 to move the quill 15 in a vertical direction.

Rack 20 is secured to a piston rod 21 which is coupled to a first piston 22 operating within a hollow cylinder 23 and to a second piston 24 operating within a hollow cylinder 25. Cylinder 23 is closed at both ends by cylinder heads 26 and 27, these heads containing holes for slidably passing the piston rod 21. At each end of cylinder 23, a connection is made to conduits 28 and 30, these conduits forming part of a closed system of pipes which include a first needle valve 31, a second needle valve 32 and a poppet valve 33 operated by an electric solenoid 34. This system, which leads to both hollow chambers of cylinder 23, is filled with oil and is used to regulate the vertical speed of the quill.

Cylinder 25 is closed at each end by heads 27 and 35 and near each of these heads external conduits 36 and 37 are connected for the passage of compressed air to operate the piston 24. The motion of compressed air into and out of the cylinder 25 is controlled by two poppet valves 38 and 40, each controlled respectively to open and close by an electric solenoid 41 and 42. Each valve is connected to an exhaust pipe 38a and 40a for connecting one of the interior portions of the cylinder 25 to the atmosphere when the piston 24 is operated by the other valve. Valves 38 and 40 are connected to a common conduit 43 which in turn is connected to a source of compressed air which may be an air compressor 44 run by a motor 45 or any other source of compressed gas.

In order to control the movements of the rack and pinion 20 and 18, a microswitch 46 (shown in detail in FIGURE 3) is mounted above the rack and in line with a sensing bar 47 mounted in a fixture 48 which is secured to rack 20. A second microswitch 50 is mounted adjacent to the right hand end of rack 20 and is designed to be actuated by a short rod 51 secured to the rack. An electrical solenoid 52 is mounted above the sensing rod 47 and is designed to arrest its movement when the rack 20 is being moved to the right at the completion of a cycle.

The rack 20, the sensing rod 47, the piston rod 21, and both cylinders 23 and 25 are mounted on a single base 53 which is secured to the side of the fixture which supports the quill 15 and the drill shaft 13. At least two springs 54 are coupled between the base 53 and the cylinder head 26 in order to support the cylinders in a resilient manner and to permit a slight movement after the arrest of the rack 20 and its associated mechanical equipment. A third micro-switch 55 is mounted adjacent to head 26 so that when the rack 20 is stopped and the compressed air passing through valve 40 still tends to move the piston 24 to the left, the entire double cylinder will be moved a short distance to the right expanding springs 54 to operate the switch 55 which reverses the direction of the quill.

During the pecking operation, it is necessary to limit the feed time between each peck. For this reason a timer dial 56 is mounted on the drilling head together with a timing motor and a switch which will be described in detail later.

In order to set the depth of cut to a high degree of accuracy, the housing 16 includes a turret 60 (see FIGURE 2) and a plurality of mounting nuts 61 to which a plurality of vertical rods 62 may be secured. Rods 62 are first terminated by a large nut or washer 63 and, for some applications, a small rod 64. The nuts 63 and rods 64 are for engagement with a sensing block 65 secured to the quill. The block 65 includes a vertical hole 66 and an entrance conduit 67 which is connected to a pipe 68 and a source of compressed air 44. Adjacent to the quill housing 16 is a side conduit 70 which supports a diaphragm 71 and a micro-switch 72. Under normal circumstances the compressed air from the source 44 moves through conduit 68 and exit channel 67 into the vertical hole 66 without any obstruction. During this time, micro-switch 72 is unactuated since there is very little pressure on diaphragm 71. Now let it be assumed that the quill 15 is moved downwardly together with the sensing block 65 and one of the small rods 64 enters hole 66. As soon as rod 64 has gone beyond the channel 67, the air flow is cut off and the air pressure builds up within the pipe 68 to flex the diaphragm 71 and actuate switch 72. After the sensing block and the quill are lowered an additional distance, the bottom portion of the block 65 meets one of the nuts 63 and the quill can move no farther. As long as the air pressure is still turned onto the right hand side of piston 24, the pressure build up forces the cylinders to the right to actuate switch 55. This sensing arrangement arrests the downward motion of the quill and prepares the circuits for an action which will reverse its motion.

The operation of the device will now be described in general terms without reference to the details of the electrical circuit.

DRILLING

When drilling operations include a single cycle of lowering the drill bit a desired distance and then raising it, the following series of operations is used. First, needle valve 31 is adjusted (with valve 33 open) to pass oil from one part of the cylinder 23 to the other at a fast rate which moves quill up or down when approaching or leaving the work. Then, needle valve 32 is adjusted (with valve 33 closed) to lower the quill at a slow speed corresponding to the cutting rate. The proper depth rod 62 is turned into position with its nut 63 at the position corresponding to the depth of the hole and with its small rod 64 corresponding to the point at which the cutting is to start. The electrical control circuit is now activated.

With the work 11 in place and the quill raised to the start position, current is supplied to normally closed solenoid valve 33, holding it open. Also, an electrical signal activates the solenoid 42 and air valve 40 which applies compressed air to the right hand portion of cylinder 25, forcing piston 24 to the left and lowering the quill and drill bit at a fast rate. During this part of the cycle, oil is transferred from one part of the cylinder 23 to the other, passing through open valve 33 and constrained only by needle valve 31.

The quill is lowered until the sensing block hole 65 engages the upper end of small rod 64 and, as soon as the rod end passes the exit conduit 67, the escaping air from conduit 68 is cut off, pressure builds up in the conduit and diaphragm 71 is moved to operate switch 72. Switch 72 operates solenoid 34 and closes valve 33 thereby forcing the oil to move throgh both needle valves 32 and 31. The quill now advances at drilling speed, cutting a hole in the work until the nut 63 limits against the sensing block 65. This stops the lowering of the drill bit at a definite point but the compressed air is still exerting force on piston 24, and as a result, cylinders 25 and 23, together with the heads and valves, are moved to the right a short distance, extending mounting springs 54. This action operates switch 55 to open the contacts and actuates solenoid 42 to operate valve 40 closing off the supply of compressed air. The right hand portion of cylinder 25 is now open to the atmosphere. At the same time, solenoid 41 is operated which applied compressed air to the left hand portion of cylinder 25 to urge the pistons, the rack 20, and the quill to their starting positions. Valve 33 remains closed but there is a by-pass conduit and a one way valve 29 (see FIGURE 5) so that oil can pass from the right hand portion of cylinder 23 to the left hand portion with almost no resistance provided by the valve 29. As soon as the rack 20 is in its original position, the drilling cycle is complete.

The milling cycle is the same as the drilling cycle except the milling cutter is retained at its lower position when the sensing block 65 makes contact with one of the nuts 63. The milling cutter with the quill may be raised to the start position by the manual operation of a push button. The circuit which raises the quill under these circumstances is described hereinafter when the entire circuit of FIGURE 3 is described.

The details of one form of solenoid valve 38 and 40 operated by solenoids 41, 42 are shown in FIGURE 4. In this form, a valve 110 is coupled to a ferromagnetic core 111 adjacent to a winding 112. When the valve is closed, a spring 113 maintains the valve 110 in a position where conduit 43 is blocked from conduit 36, or 37. At this time air may move through conduit 36 or 37 to the atmosphere through exit conduit 38*a* or 40*a*. When current is applied to winding 112, the core 111 is moved to the right and the valve 110 is moved to the position indicated by the dotted lines, opening condit 43 to conduit 36 or 37 and closing exit conduit 38*a* or 40*a*.

Valve 33 is constructed so that the unactuated valve blocks oil from moving from the left portion of cylinder 23 to the right portion. At the same time oil may move from right to left. There are many forms of solenoid valves which operate in this manner. The valve shown in FIGURE 6 is one type, having a positive valve action operated by the solenoid but including a one-way by-pass conduit 114. The solenoid 34 is the same as solenoid 41–42, having a winding 112, a valve 110, and a return spring 113. When the valve is closed, oil can still pass from conduit 30 through conduit 114, past valve 29 by lifting the valve disk 29 against a spring 115, and then into conduit 28.

TAPPING

The tapping cycle is similar to the drilling cycle except that after the lowering of the tap into the hole, the tap is withdrawn from the work at the same speed as it entered. For such a cycle, the thin rod 64 is removed from its lower support 62 and only the nut 63, which controls the depth of the quill travel is used.

At the start, a conventional tapping gear (not shown) is attached to the lower end of shaft 13 so that when pressure is added to the thread cutting tool, the tool turns in one direction. When pressure is removed and the shaft withdrawn, change of gear is made and the tool automatically turns in the reverse direction.

Valve 33 remains open during the entire cycle, therefore the rate of movement of the rack 20 is the same in both directions, and is determined by the setting of valve 31. At the start, valve 40 is operated, applying compressed air to the right hand portion of cylinder 25. The quill and tap are lowered at the cutting speed set by valve 31 until the nut 63 comes in contact with the lower surface of the sensing block 65. The compressed air forces the cylinders 25 and 23 a short distance to the right, switch 55 is operated, and the quill direction is reversed. As before, valve 40 is closed (but opening the cylinder to pipe 40*a*) and valve 38 is opened, thereby retracting the rack and piston array to the start position.

PECKING

Pecking operations are designed for drilling deep holes which require frequent withdrawal of the drill at various depths to clear away the chips. The closure of a packing switch 87 (see FIGURE 5) sets the circuit for this operation so that both microswitch 46 and 72 must be actuated to close valve 33 and connect the timer 56 to the circuit so that the time duration of each segment of the drilling operation is liimted. The timer 56 comprises a motor and a switch. When current is supplied to the motor, it runs for a set time interval after which time the switch is closed.

At the start, valve 40 sends compressed air to the right hand portion of cylinder 25, moving the rack 20, the rod 47, and the quill 15, at a fast rate toward the work to be drilled. Rod 47 actuates microswitch 46 but valve 33 remains open. Small rod 64 enters the hole 66 in sensing block 65 and when the exit conduit 67 is blocked, the pressure rises, diaphragm 71 is flexed, switch 72 is operated and valve 33 is closed. This action forces oil through valve 32 and lowers the quill at a much reduced rate.

The pecking rod 47 is secured to a fixture 48 by friction only but the friction is great enough to cause the operation of microswitch 46 when the rack advances beyond the point at which the rod 47 contacts the plunger of switch 46.

FIGURE 3 shows the details of a limit stop attached to microswitch 46. A nut 127 is threaded onto the plunger sleeve and a cylindrical stop 128 placed next to it. When the pecking rod 47 strikes the plunger 130, it actuates the switch and then limits against the cylinder 128. However, the rack, quill, and drill bit continue to advance to drill the hole while the pecking rod 47 slips through the advancing fixtures 48 as switch 46 limits the travel of the rod 47. This combination of motions continues until the timer stops and closes the timer switch. At this time, the direction of the rack and quill are reversed by the operation of valves 38 and 40 but the pecking rod 47 is now in a new position within the fixture, having been moved to the right a short distance less than the distance drilled by reason of the fact that drilling began before the rod bottomed on cylinder 128. The distance between the end of the drill and the bottom of the drilled hole at the beginning of each successive drilling operation can be regulated by an adjustment of the portion of the cylindrical stop 128 upon the plunger sleeve. During the operating intervals of the pecking sequence, the reset solenoid 52 receives current so that its core 52A is moved upwardly, out of the way of rod 47.

Each time the drill, quill, and rack are retracted, the sensing block 65 moves above the top end of rod 64, thereby normalizing switch 72 and again advancing the drill.

On each succeeding drilling sequence, the pecking rod is moved to the right a short distance, this distance is just short of the amount drilled during each incremental action. The drill is moved deeper into the work until, finally, nut 63 intercepts the sensing block, microswitch 55 is operated and the rack is returned to its original position. Just prior to the final movement, current is cut off from solenoid 52, the plunger 52A acts as a limit stop, drops to the position shown in FIGURE 1, and the pecking rod is restored to its original position when the rack 20 is normalized.

CONTROL CIRCUIT

The three micro-switches described above detect the motion and position of components of the drilling device and send these signals to a control circuit shown in FIGURE 5 to produce the desired action. In addition, there are manually operated toggle switches to turn on the power and to select the desired program also, there are push button contacts to start operations. The four solenoids 41, 42, 34, and 52 are operated by the circuit to control the sequence of operations. Three relays are employed in the control circuit. A provision has been made for operating the drilling device by means of a tape containing punched holes or magnetic activated areas. This type of control is not a part of the present invention and its details will not be described here.

The electrical control circuit includes a pair of terminals 80 which are to be connected to a source of alternating current power. A fuse 81 and a main power switch 82 are connected in series with one terminal while the other terminals is connected to a ground wire 83. An indicating lamp 84 tells when power is appiled to a power conductor 85 to activate the control circuit and operate the four solenoids 34, 41, 42, and 52, and the timer motor 56. There are two toggle switches for manual operation. A first toggle switch 86 selects control circuits for the milling. A second toggle switch 87 selects control circuits for the pecking operation. There are three microswitches 46, 55 and 72 which are operated by the moving parts of the control mechanism as described above. There are three relays 88, 90 and 91 which control current to the four solenoids. And, there are two manually operated push buttons 92 and 93, the first button 92 operating two normally open contacts 94 and 95 to control circuits to move the quill up. The second button 93 operates a single normally open pair of contacts 96.

The operation of the control circuit to drill is as follows: To start the drilling operation, switch 86 is closed. The operation of this switch, however, does not complete any circuit at this time. Next, the "DOWN" push button 93 is manually operated and contacts 96 are closed momentarily, thereby completing a circuit from the power conductor 85, through contacts 96, through winding 97 of relay 90, to the ground conductor 83. This circuit activates relay 90 and closes contacts 98 and 100. Contacts 98 are holding contacts and retain the armature of relay 90 in its actuated condition by means of a holding circuit which can be traced from the ground conductor 83, through winding 97, contacts 98, contacts 94 of the "UP" switch 92, conductor 99, closed contacts 101 of relay 91, and over conductor 121 to the power conductor 85. This holding circuit retains relay 90 in its actuated condition until relay 91 is actuated and contacts 101 are opened, or 92 is actuated and contacts 94 are opened.

Contacts 100 on relay 90 now complete a circuit which may be traced from the power conductor 85, through contacts 101 of relay 91, through contacts 94 under the "UP" push button 92, then through contacts 100 of activated relay 90, and normally closed contacts 102 and 103 of relay 88 to solenoids 42 and 34, operating them and opening oil valve 33. Solenoid 52 is also operated because of a direct connection over conductor 104 to the solenoid and the ground conductor 83. Solenoid 42 opens valve 40 (see FIGURE 1) and compressed air is applied to the right hand portion of cylinder 25, forcing rod 21 to the left and lowering the quill 15 and drill bit. Solenoid 34 opens valve 33 and permits oil to be transferred from the left hand portion of cylinder 23 to the right hand portion at a rapid rate.

The rapid lowering movement of the quill continues until the rod 64 enters sensing block 65 and closes the exit conduit 67. At this time micro-switch 72 is closed and current is applied through the switch contacts to winding 105 of relay 88, thereby opening contacts 102 and 103 and closing contact 106. When contacts 102 and 103 are broken, air valve 40 is deactivated. When contacts 103 are opened, oil valve 33 is closed and the oil must then flow through needle valve 32 at a much reduced rate. This portion of the quill movement corresponds to the drilling operation and valve 32 is manually adjusted for this speed.

The slow movement of the quill continues until the lower surface of the sensing block 65 makes contact with nut 63. At this time, the force of the compressed air on piston 24 moves the cylinders 23 and 25 to the right, extending springs 54 and momentarily closing contacts 55. This action actuates relay 91, sending current through winding 108, breaking contacts 101 and closing contacts 116 and 117. When contacts 101 are opened the holding circuit to relay 90 is broken whereupon current to solenoid 52 is broken.

When contacts 117 are closed, a circuit is completed which may be traced from the power conductors 85 and 121, through contacts 117, through the blade of closed switch 86, over conductors 118 and 120 to solenoid 41, operating it and opening valve 38 to admit compressed air to the left hand portion of cylinder 25 and move piston 24, rod 21, and rack 20 to the right to raise the quill 15 and drill bit at a fast rate. Valve 33 is still closed but the by-pass conduit 114 (see FIGURE 6) permits oil to flow rapidly from the right hand portion of cylinder 23 to the left portion through valve 29.

As soon as the quill has moved up far enough to remove rod 64 from hole 66, microswitch 72 is opened, the circuit to winding 105 of relay 88 is broken, normalizing the relay, and again closing contacts 102 and 103. However, relay 90 was normalized by the opening of contacts 101 on relay 91. When the quill has reached its normal raised position, the pin 51 on rack 20 strikes micro-switch 50 (See FIGURE 1) which signals the completion of the cycle to a sensing device (not shown).

When a tapping operation is to be performed, rod 64 is removed from post 62. The machine functions in the above described manner as for drilling except that switch 72 remains open thereby maintaining contacts 102, 103 in the closed position. This action holds valve 33 open throughout the cycle. Valves 40 and 52 are deactivated when the holding circuit on relay 90 is broken.

During the tapping operation the quill speed is regulated by the valve 31.

The operation of the control circuit to peck drill is as follows: To start the peck drilling operation, switches 86 and 87 are closed. Next, the "DOWN" push button 93 is manually operated and contacts 96 are closed momentarily, thereby completing a circuit from the power conductor 85, through contacts 96, through winding 97 of relay 90, to the ground conductor 83. This circuit activates relay 90 and closes contacts 98 and 100. Contacts 98 are holding contacts and retain the armature of relay 90 in its actuated condition by means of the holding circuit described in drilling.

Contacts 100 on relay 90 now complete a circuit which may be traced from the power conductor 85, through contacts 101 of relay 91, through contacts 94 under the "UP" push button 92, then through contacts 100 of activated relay 90, and normally closed contacts 102 and 103 of relay 88 to solenoids 42 and 34, operating them and opening oil valve 33. Solenoid 34 also receives power from line 104 through switches 87 and 46. Solenoid 52 is also operated because of a direct connection over conductor 104 to the solenoid and the ground conductor 83. Solenoid 42 opens valve 40 (see FIGURE 1) and compressed air is applied to the right hand portion of cylinder 25, forcing rod 21 to the left opening switch 46 and lowering the quill 15 and drill bit. Normally closed valve 33 which was opened by solenoid 34 permits oil to be transferred from the left hand portion of cylinder 23 to the right hand portion at a rapid rate.

The rapid lowering movement of the quill continues until the rod 64 enters sensing block 65 and closes the exit conduit 67. At this time microswitch 72 is closed and current is applied through the switch contacts to winding 105 of relay 88 thereby opening contacts 102 and 103 and closing contacts 106. When contacts 103 are opened, oil valve 33 is closed and the oil must then flow through needle valve 32 at a much reduced rate, as described in the drilling operation.

When contacts 106 are closed current flows through switch 87 to timer motor coil and to switch 126. When the time cycle is completed switch 126 closes and current is supplied through conduit 118 to solenoid 41 which raises the quill at a rapid rate until pin 64 leaves sensing block 66 and microswitch 72 is opened.

When microswitch 72 is opened, relay 91 returns to a normal position, contacts 102, 103 are closed and solenoids 42 and 34 are energized, contacts 106 are then broken cutting current to the timer motor which opens switch 126, breaking current to solenoid 41. The cycle is then repeated until block 65 hits pin 62, except that switch 72 is closed first and switch 46 is opened after the tool descends to a point just short of the reverse direction depth.

The slow movement of the quill continues until the lower surface of the sensing block 65 makes contact with nut 63. At this time, the force of the compressed air on piston 24 moves the cylinders 23 and 25 to the right, extending springs 54 and momentarily closing contacts 55. This action actuates relay 91, sending current through winding 108, breaking contacts 101 and closing contact 117. When contacts 101 are opened the holding circuit to relay 90 is broken whereupon current to solenoid 52 is broken.

When contacts 117 are closed, a circuit is completed which may be traced from power conductors 85 and 121, through contacts 117, through the blade of closed switch 86, over conductors 118 and 120 to solenoid 41, operating it and opening valve 38 to admit compressed air to the left hand portion of cylinder 25 and move piston 24, rod 21, and rack 20 to the right to raise the quill 15 and drill bit at a fast rate.

The mechanism described above can be arranged for milling sequences, and operation by an external punched tape control. Multiple sequence operations can be arranged to drill or tap one hole, move the table 11 to a new location and then repeat the operation.

Having thus fully described the invention, what is claimed as new and desired to be secured by Letters Patent of the United States, is:

1. A control means for a drill press including a quill containing a rotatable shaft and a bit for drilling holes in a work piece comprising:
   (a) a rack and pinion coupled to the quill for moving it in an axial direction,
   (b) a first piston within a first double cylinder connected to said rack for moving the rack in either direction along the cylinder axis,
   (c) first and second electrically operated solenoid valves connected respectively to the ends of said cylinder for admitting compressed gas to the cylinder and for moving the piston,
   (d) a second piston within a second double cylinder also connected to said rack for moving a liquid from one portion of the cylinder to another to control the travel speed of the rack,
   (e) a conduit connecting the ends of the second double cylinder for conveying the liquid,
   (f) an adjustable valve in said conduit for limiting the liquid flow between cylinder ends,
   (g) a sensing means coupled between the quill and a base supporting the work piece for determining the position of the bit,
   (h) electrical connecting means between the sensing means and said first and second solenoid valves for raising and lowering the quill to cut a desired depth, and
   (i) said sensing means includes a means for determining a first position determination corresponding to the engagement of the bit with the work, and means for determining a second position determination corresponding to the desired depth of the hole to be drilled.

2. A control means as claimed in claim 1 wherein a by-pass conduit is connected around said adjustable valve, said by-pass conduit including a third solenoid valve for changing the speed of the liquid as it moves between said second double cylinders.

3. A control means as claimed in claim 1 wherein said first and second double cylinders are connected together and resiliently mounted to a base, said cylinders coupled to a first electrical switch for its operation whenever the sensing means is actuated to sense a desired hole depth.

4. A control means as claimed in claim 1 wherein a pecking rod is frictionally mounted on said rack, a second electrical switch is mounted for actuation by the rod, and electrical control means are connected between said second switch and said third solenoid valve for reducing the speed of the drill when the second electrical switch is actuated by the pecking rod, whereby the drill will resume cutting as it reaches the undrilled portion of the workpiece.

5. A control means as claimed in claim 4 wherein a timing device is mounted on the base and operates to close a timing switch a predetermined time after the pecking rod has operated the second electrical switch, and electrical control means connected between the timing switch and said first and second solenoids for reversing the direction of movement of the rack and quill to withdraw the drill bit from the work to clean out the chips.

6. A control means as claimed in claim 4 wherein said third solenoid valve is provided with a by-pass means for permitting liquid to pass freely in one direction while shutting off flow in the other direction thereby permitting the drill bit to be withdrawn and returned at a fast rate but lowered to drill a hole at a slow rate.

7. A control means as claimed in claim 4 wherein said second electrical switch is provided with a limit means surrounding a plunger which joins the switch contacts, said limit means including a hollow cylinder, the end of which limits the pecking rod and causes it to slide in its frictional mounting.

8. A control means as claimed in claim 4 wherein each of said first and second solenoid valves have exit ports open to the atmosphere so that when the valves are closed and shut off compressed gas to the associated cylinder, gas is released from that portion of the cylinder.

9. A control means as claimed in claim 4 wherein a stop means, operated by an electrical solenoid, is arranged to be placed in the path of the pecking rod to restore it to its original position after a sequence of drilling operations is performed.

10. A control means as claimed in claim 7 wherein the position of said limit means is adjustable in a direction parallel with the motion of the switch plunger.

11. A control means as claimed in claim 1 wherein said means for determining a first position comprises a rod mounted on a portion of the quill housing and a switching means mounted on the quill and movable with it, said switching means including a block having a hole through which the rod passes when the quill is lowered, and coupling means between the sensing block and the switch for operating the switch when the end of the rod enters the hole.

12. A control means as claimed in claim 11 wherein a plurality of rods, each having a predetermined length, are mounted on a rotatable plate for selective positioning in line with the hole in the sensing block.

13. A control means as claimed in claim 1 wherein said means for determining a second position comprises a rod mounted on a portion of the quill housing and a nut mounted on the rod in spaced relation to said sensing means, means for resiliently mounting said cylinders on a base, and a switching means secured to the base for operation by the cylinders when the quill sensing means makes contact with the nut on the rod and moves the cylinders against the resilient mounting.

References Cited

UNITED STATES PATENTS

| 2,901,916 | 9/1959 | Heyer | 77—33.7 XR |
| 2,991,760 | 7/1961 | Rhine | 92—11 XR |

FRANCIS S. HUSAR, Primary Examiner

U.S. Cl. X.R.

77—33.7; 91—392; 92—11